Patented Apr. 6, 1943

2,316,129

UNITED STATES PATENT OFFICE 2,316,129

CYANOETHYL STARCH ETHERS

Louis H. Bock, Huntingdon Valley, and Alva L. Houk, Philadelphia, Pa., assignors to Röhm & Haas Company, Philadelphia, Pa., a corporation of Delaware No Drawing. Application February 21, 1942, Serial No. 431,841

5 Claims. (Cl. 260—209)

This invention relates to ethers of starch which are insoluble in water and in which hydroxyl groups are etherified with β-cyanoethyl groups. This invention further relates to the process of reacting starch with acrylonitrile in the presence of a strong alkali, whereby the water-insoluble β-cyanoethyl starch ethers are produced.

The β-cyanoethyl starch ethers of this invention are prepared by mixing between about 0° and about 40° C. starch, a dilute solution of a water-soluble, strong alkali, and acrylonitrile. As a starch there may be used root or grain starches, such as potato, tapioca, corn, wheat, or the like. As a strong alkali there may be used an alkali metal hydroxide, such as lithium, sodium, or potassium hydroxide, or a strong organic base, such as tetraethyl ammonium hydroxide, benzyl trimethyl ammonium hydroxide, dibenzyl dimethyl ammonium hydroxide, or the like. From 0.025 to 0.5 mol of a water-soluble, strongly basic hydroxide per glucose unit of the starch may be used as a catalyst for the reaction in solutions of 0.1% to about 2%. The proportion of acrylonitrile should be at least three mols per glucose unit. No advantage is gained, however, in mixing more than five mols, as amounts above this proportion cause no additional reaction.

In reacting starch and acrylonitrile in the presence of a dilute solution of a strongly alkaline catalyst, the starch need only be suspended in the solution, acrylonitrile added, and the mixture stirred until the cyanoethyl ether precipitates. While the temperature of the reacting mixture may be as low as 0° and as high as about 40° C., the optimum temperature range is from about 20° to about 30° C., or room temperatures. Under such conditions, reaction is complete in three to five hours. The time required may be shortened by raising the temperature.

The following examples are presented to illustrate the invention:

Example 1

To 330 parts of potato starch in 3,000 parts of water there were added 100 parts of 20% sodium hydroxide and 530 parts of acrylonitrile in small, successive portions. The reaction mixture was stirred until all the starch was precipitated, about three hours being required. The product was then filtered, washed well with water, and dried. It contained 11.6% of nitrogen, corresponding to 2.4 cyanoethyl groups per glucose unit.

Example 2

To a paste containing 33 parts of tapioca starch, 300 parts of water, and 10 parts of 20% sodium hydroxide, there was added 31.8 parts (3 mols) of acrylonitrile. The reaction mixture was stirred at room temperature until a precipitate formed, about four and one-half hours being required. The product was filtered, washed, and dried. It contained 9.3% of nitrogen.

Example 3

To 33 parts of potato starch in 200 parts of water there were added 20 parts of 20% sodium hydroxide and 53 parts of acrylonitrile. The mixture was stirred at 0° to 5° C. for seven hours, by which time the desired reaction product had completely separated. The liquor was poured off and the product was washed substantially free of caustic and spread out to dry. When partially dry, it was very rubber-like but, when completely dry, it was brittle.

The product as formed is a gummy solid which becomes hard on drying in an oven. While it tends to swell in water, it is completely insoluble therein. It is swelled by 75% acetic acid but is insoluble in the common organic solvents. It can be dispersed in water by milling with an emulsifying agent such as triethanolamine oleate. This dispersion is useful as a coating agent for textiles, forming a washfast finish which imparts weight and stiffness to the fabric. The product is also useful as a binding agent for pigments and dyes for printing textiles.

We claim:

1. The process of preparing water-insoluble β-cyanoethyl ethers of starch which comprises mixing between 0° and about 40° C. starch and acrylonitrile in a dilute solution of a water-soluble, strongly basic hydroxide, the proportion of acrylonitrile being at least three mols per glucose unit of the starch.

2. The process of preparing water-insoluble β-cyanoethyl ethers of starch which comprises reacting by mixing starch and at least three mols of acrylonitrile per glucose unit of the starch in a 0.1% to 2% aqueous solution of a water-soluble, strongly basic hydroxide and maintaining the temperature of the mixture between 0° and about 40° C. until β-cyanoethyl starch ether has precipitated.

3. The process of preparing water-insoluble β-cyanoethyl ethers of starch which comprises reacting by mixing between about 20° and 30° C. starch and at least three mols of acrylonitrile per glucose unit of the starch in a 0.1% to 2% aqueous solution of a water-soluble, strongly basic hydroxide.

4. The process of claim 3 in which the hydroxide is sodium hydroxide.

5. The process of claim 3 in which the starch is potato starch.

LOUIS H. BOCK.
ALVA L. HOUK.